Patented June 1, 1954

2,680,108

UNITED STATES PATENT OFFICE 2,680,108

PROCESS OF PRODUCING REACTION PRODUCTS FROM HIGHER MOLECULAR COMPOUNDS CONTAINING HYDROXYL GROUPS AND A TITANIUM COMPLEX

Fritz Schmidt, Leverkusen, Germany, assignor to Farbenfabriken Bayer Aktiengesellschaft, Leverkusen, Germany, a manufacturing and trading organization of Germany No Drawing. Application August 8, 1951,
Serial No. 240,976

6 Claims. (Cl. 260—75)

The present invention relates to a process of producing reaction products from higher molecular compounds containing hydroxyl groups by reacting said compounds with stabilized complex titanic acid esters.

Ortho-titanic acid esters of lower monovalent alcohols, for instance, titanic acid tetraethyl esters or titanic acid tetrabutyl esters, hereinafter called simple titanic acid esters, undergo reaction with acetyl cellulose. The cross-linking taking place in the reaction is recognized, for instance, by the gelation of the spinning solution which almost instantaneously occurs after the addition of simple titanic acid esters to the spinning solution (see Reports No. 9–10 of August-September 1935 and No. 14c of November 2, 1936, by Dr. Johannes Nelles, I. G. Farbenindustrie A. G. Leverkusen which have been rendered available to the public by FIAT in 1946.

The reaction of simple titanic acid esters upon higher molecular compounds containing hydroxyl groups has afterwards been described by other authors (see, for instance, Chem. Weekblad 45, 190 (1949) according to J. Oil and Colour Chem. Assoc. 31,405 (1948)).

Besides the above mentioned solutions of acetyl cellulose other higher molecular compounds containing hydroxyl groups, such as for instance, by bathing acetate silk threads in diresins and the like, immediately react with simple titanic acid esters with the formation of high-molecular cross-linked gels.

Because of the rapid course of cross-linking the above described reactions could not be utilized on a large scale, since gels, as is known, do not give uniform structures, for instance, smooth films, foils or threads. Therefore, it has only been possible up to the present to subsequently treat such structures with titanic acid esters, for instance, by bathing acetate silk threads in dilute solutions of titanic esters (see Reports by Dr. Nelles loc. cit.).

In accordance with the invention reaction products of higher molecular compounds containing hydroxyl groups are obtained by reacting said compounds with stabilized complex titanic acid esters obtained by reacting reactive derivatives of titanic acid, for instance, halides or esters thereof, with organic compounds containing groups which are capable of forming complex compounds with titanium, such as the carbonyl group.

The annoying immediate cross-linking occurring by the addition of titanic acid esters and the resulting gelation or swelling of solutions of the higher molecular compounds containing hydroxyl groups are overcome according to the invention by the use of stabilized complex titanic acid esters instead of simple esters.

The stabilized titanic acid esters are obtained, for instance, by reacting 4-valent titanic acid halides or esters with aldehyde or keto alcohols or dicarbonyl compounds, such as for instance, diacetone alcohol, β-ketobutanol, β-hydroxy-butyraldehyde, aceto acetic ester, diacetyl, acetyl acetone, polymeric vinyl-methyl-ketones etc. In this reaction the complex formation probably proceeds as the formation of chelate compounds by the action of solitary pairs of electrons, whereby the titanium acts with the coordination number 6, for instance, to form the compounds:

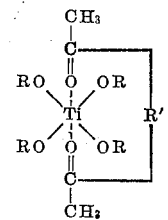

or

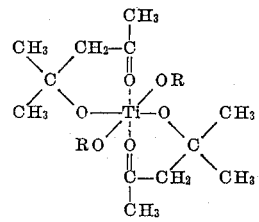

R standing for $C_2H_5$, $C_4H_9$ etc., R' for $CH_2$, $C_2H_4$ etc.

However, it may also be possible that, for instance, the dicarbonyl compounds react as unsaturated hydroxy carbonyl compounds in their enol form.

Complex titanic acid compounds of aldehyde- or keto alcohols may be obtained by conventional methods, for instance, by reacting titanium tetrachloride upon hydroxy carbonyl compounds, or preferably by interchange of simple lower aliphatic titanic acid esters, for instance, from titanic acid tetraethyl ester and diacetone alcohol. The ester interchange is sometimes effected already at room temperature within a short time with the evolution of heat, whereas the interchange of simple titanic acid esters with simple alcohols does not proceed exothermally. The interchange may also be accomplished at elevated temperature and the simple alcohol becoming free may be separated, for instance, by distillation.

The reaction of simple titanic esters with dicarbonyl compounds, for instance, acetyl acetone or aceto acetic ester, likewise proceeds exothermally. Therefore, mixing the components suffices to yield complex esters of titanic acid. If desired, the reaction may be conducted at higher temperature.

The complex compounds of titanic acid obtained as described in the foregoing are obviously more stable than the simple esters; on the other hand, they are still reactive in such a manner that they can undergo reaction in admixture with solutions of higher molecular compounds containing hydroxyl groups after evaporating the solvent, if necessary with heating. It is thus possible to produce uniformly shaped, cross-linked, high-molecular structures, for instance, films, foils, threads etc. in known manner by heating, casting, molding, spinning etc. The process of the present invention offers the possibility of converting cellulose derivatives, polyesters containing hydroxyl groups, sugar derivatives, formaldehyde condensation products etc. into higher molecular compounds which are insoluble after final shaping.

The present invention is further illustrated by the following examples without being restricted thereto, the parts given being by weight.

Example 1

30 parts of a stabilized titanium compound are mixed with 100 parts of a 20% nitrocellulose solution consisting of 615 parts of nitrocellulose in 25 parts of butanol, 680 parts of butyl acetate and 680 parts of ethyl acetate. The uniform solution is cast on a suitable support to form a thin layer, which, after evaporating the solvent at room temperature or more rapidly at elevated temperature, gives a clear, smooth film which is insoluble in organic solvents. If the simple titanic acid tetrabutyl ester is used instead of the above mentioned titanium compound, gelation of the nitrocellulose solution occurs immediately, thus preventing the production of a smooth film.

The production of the above-mentioned stabilized titanium compound is carried out in the following manner:

340 parts of titanic acid tetrabutyl ester are slowly heated with 232 parts of diacetone alcohol under a reflux condenser to 80° C. under a pressure of 14 mm. Hg until distillation ceases. In the reaction vessel there remain 230 parts of a yellow-orange colored viscous titanium compound which is soluble in many organic solvents, such as alcohol, acetic acid ethyl ester, benzene, gasoline and carbon tetrachloride, and is only slowly affected by water.

Example 2

40 parts of a complex titanic acid ester are intimately mixed with 100 parts of a solution consisting of 6 parts of acetyl cellulose and 94 parts of acetone. After expelling the solvent, if necessary, at elevated temperature, the acetyl cellulose is no longer soluble in acetone.

The complex titanic acid ester is prepared in the following way: 260 parts of acetoacetic acid ethyl ester are added to 340 parts of titanic acid tetrabutyl ester. The mixture which first consists of two layers, becomes homogeneous on stirring or shaking within a few minutes with the evolution of heat. After cooling the reaction product is soluble in many organic solvents, such as alcohol, acetic ester, gasoline, benzene, carbon tetrachloride, and essentially more stable than the simple titanic acid tetrabutyl ester.

Example 3

65 parts of a complex liquid titanic acid derivative are mixed with 50 parts of a viscous polyester containing 10% of hydroxyl groups, obtained by thermal esterification of adipic acid and trimethylol propane and dissolved in 50 parts of acetic acid ethyl ester. The clear uniform solution thus obtained is sprayed on a bare metal sheet by means of a spraying pistol and yields after evaporating the solvent, if necessary, at elevated temperature, a hard, well adhesive, smooth coating which is not longer soluble in organic solvents, for instance, alcohol, ethyl acetate, benzene and gasoline. By increasing the quantity of the complex titanic acid derivative the coating becomes harder; smaller quantities give softer coatings.

However, on using normal titanic acid tetrapropylesters immediate cross-linking or gelation of the polyester solution takes place in every case so that a uniform application of the solution is not possible.

The above-mentioned complex liquid titanic acid derivative is prepared as follows:

284 parts of titanic acid tetrapropyl ester are mixed with 200 parts of acetyl acetone. After the evolution of heat has ceased a complex, orange-yellow, liquid titanic acid derivative is obtained which is very stable to hydrolysis.

I claim:

1. A high molecular cross-linked reaction product of nitrocellulose with a stabilized complex titanic acid ester, said ester being the reaction product of titanic acid tetrabutyl ester and diacetone alcohol.

2. A high molecular cross-linked reaction product of acetyl cellulose with a stabilized complex titanic acid ester, said ester being the reaction product of titanic acid tetrabutyl ester and aceto acetic acid ethyl ester.

3. A high molecular cross-linked reaction product of a viscous polyester containing 10% hydroxyl groups, said polyester being the product of thermal esterification of adipic acid and trimethylol propane with a stabilized complex titanic acid ester, said titanic ester being the reaction product of titanic acid tetrapropyl ester and acetyl acetone.

4. A high molecular cross-link reaction product of a polymeric compound containing a hydroxyl group with a stabilized, complex, titanic acid ester having a carbonyl-containing organic compound selected from the group consisting of aldehyde and ketone compounds bound in complex formation therewith.

5. Process for the production of reaction products of polymeric compounds containing hydroxyl groups which comprises reacting such a polymeric compound with a stabilized, complex, titanic acid ester having a carbonyl-containing organic compound selected from the group consisting of aldehyde and ketone compounds bound in complex formation therewith.

6. Process according to claim 5, in which said stabilized, complex, titanic acid ester is obtained by reacting a reactive derivative of titanic acid selected from the group consisting of titanic acid esters and titanic acid halides with an organic compound containing a member selected from the group consisting of aldehyde and ketone groups capable of forming complex compounds with titanium.

References Cited in the file of this patent

UNITED STATES PATENTS

| Number | Name | Date |
|---|---|---|
| 2,453,520 | Langkammerer | Nov. 9, 1948 |
| 2,489,651 | Langkammerer | Nov. 29, 1949 |
| 2,518,193 | Signaigo | Aug. 8, 1950 |
| 2,549,940 | Signaigo | Apr. 24, 1951 |

OTHER REFERENCES

W. Dilthey, Berichte Deut. Chem. Gesel., vol. 37, 1904, pp. 588-590.

M. F. Evard, Comptes Rendus, vol. 196, 1933, pp. 2007-2009.